United States Patent [19]

Walser

[11] Patent Number: 5,772,002

[45] Date of Patent: Jun. 30, 1998

[54] SUSPENDED STORAGE APPARATUS

[75] Inventor: Hans Heiri Walser, Grüsch, Switzerland

[73] Assignee: Sapal Societe Anonyme des Plieuses Automatiques, Ecublens, Switzerland

[21] Appl. No.: 571,911

[22] PCT Filed: May 2, 1995

[86] PCT No.: PCT/CH95/00095

§ 371 Date: Feb. 9, 1996

§ 102(e) Date: Feb. 9, 1996

[87] PCT Pub. No.: WO95/29861

PCT Pub. Date: Nov. 9, 1995

[30] Foreign Application Priority Data

May 3, 1994 [FR] France ................................. 94 05711

[51] Int. Cl.⁶ .................................................. B65G 47/04
[52] U.S. Cl. .................. 198/465.3; 198/812; 198/860.2; 198/861.1
[58] Field of Search ............................ 198/465.1, 465.4, 198/475.1, 687.1, 794, 803.01, 812, 860.2, 861.1

[56] References Cited

U.S. PATENT DOCUMENTS

| 2,823,811 | 2/1958 | Temple | 198/797 |
|---|---|---|---|
| 3,851,764 | 12/1974 | Anders | 198/797 |
| 4,720,228 | 1/1988 | Horiguchi et al. | 198/465.1 |
| 5,065,499 | 11/1991 | Luciano et al. | 198/465.1 |

FOREIGN PATENT DOCUMENTS

| 0538742 | 10/1992 | European Pat. Off. . |
|---|---|---|
| 626027 | 12/1962 | France . |
| 3148473 | 6/1983 | Germany . |

Primary Examiner—Joseph E. Valenza
Attorney, Agent, or Firm—Davis and Bujold

[57] ABSTRACT

An apparatus particularly suitable for the suspended storage of foodstuffs in any available space, comprising a frame consisting of at least one basic module (30) with four vertical posts (31a, 31b, 31c, 31d) joined together in pairs by upper (35) and lower (34) longitudinal coupling members and upper (37) and lower (36) transverse coupling members. The lower ends of the posts comprise four lower connecting members (32a, 32b, 32c, 32d) and four upper connecting members (33a, 33b, 33c, 33d), the connecting members being provided with coupling devices for mounting horizontally or vertically adjacent modules.

12 Claims, 8 Drawing Sheets

SUSPENDED STORAGE APPARATUS

The present invention concerns a pendulant product storage installation, in particular for food products, and more particularly for bars of chocolate or the like, these products being placed on shelves arranged horizontally on pendulant product carriers horizontally suspended on two chains mounted on a frame and moving parallel to each other in a closed circuit comprising a feed section going from a station for loading the products on the shelves, to a product receiving station arranged for unloading the shelves, and a return section in which the shelves are brought back empty from the receiving station to the loading station, in which the frame consists of a least one basic module comprising four vertical columns which are connected to each other in pairs by upper and lower longitudinal coupling members respectively and by upper and lower transversal coupling members respectively.

Numerous pendulant storage installations are already known, in particular that disclosed in the European Patent application published under number 0 538 742 A1. In food product production lines, for example of bars of chocolate, biscuits, chocolate covered products and other products which are fragile and delicate to handle, it is often necessary to be able to have a temporary storage installation available for these products, given that production is carried out continuously while packaging is carried out in batches and the packaging units of a same line are periodically subject to halts required for maintenance, repair or the placing of packing material.

These storage installations must comply with relatively burdensome specifications. They must allow large storage capacity and assure efficient and careful transport of the products from a loading station to a receiving station, while providing maximum security for the conveyed products, great flexibility of use and variable storage potential as a function of the instant demand.

One of the problems presented by these installations is space requirement. It is easy to understand that the user wishes to have available the greatest possible storage capacity for the minimum amount of space. Furthermore, in most cases, an installation of this type must be able to be erected in existing premises, which requires a "made to measure" configuration. Indeed, except in the case of a new building, it is often difficult, and rarely desirable, to adapt an existing building to the space requirements imposed by the erection of a storage installation on a product packaging line. Consequently, the manufacturer of this type of installation must usually adapt the design of his storage installation to a set of parameters which are connected on the one hand to the products, and on the other hard to the space available. This results in a compromise which does not always offer the ideal solution to storage problems. Most existing installations are standard constructions, comprising a fixed frame on which are mounted the two chains which carry the pendulant product carriers intended to receive the products. The design of this rigid construction does not enable the storage problem to be optimised to take account of parameters connected to the products without becoming dependent on parameters connected to the available space.

The present invention proposes to resolve the aforementioned problem by overcoming the disadvantages of the known prior systems, and offering great flexibility of use as well as the ability to be adapted as a function of different applications, so as to give this installation a substantially universal character.

These objects are achieved by the storage installation according to the invention which is characterised in that said vertical columns comprise at each of their ends four upper and lower connecting members respectively, and in that these connecting members are provided with coupling means arranged for assuring the assembly of adjacent and/or superposed modules.

In a preferred embodiment, the lower connecting members are arranged for carrying a lower sprocket wheel A and the upper connecting members are arranged for carrying an upper sprocket wheel B for guiding the chains, the lower longitudinal coupling members being arranged for carrying at least one complementary sprocket wheel A and the upper longitudinal coupling members being arranged for carrying at least one complementary sprocket wheel B for guiding the chains.

In an advantageous manner, the distance between two neighbouring lower sprocket wheels and the distance between two neighbouring upper sprocket wheels has a constant value d and the lower and upper longitudinal coupling members have a length substantially equal to a multiple of this distance d which separates two neighbouring sprocket wheels.

In an alternative embodiment, the installation may comprise several juxtaposed and/or superposed modules, these modules being connected in pairs by common connecting members, the longitudinal coupling members having lengths ranging between d and nd, where n is an integer greater than 1.

The connecting members are preferably constituted by studs fixed to the ends of the vertical columns, these studs having a parallelepipedic shape of square or rectangular cross-section and having four flat faces arranged for fixing the lower and upper longitudinal coupling members and the lower and upper transversal coupling members.

In an advantageous manner, the longitudinal coupling members comprise a crossbeam supporting the sprocket wheels and two stiffening rods arranged respectively on either side of said crossbeam.

In the preferred embodiment, the connecting members are arranged for each carrying a sprocket wheel.

In an advantageous manner, the installation comprises at least one automatic shelf exchanger and this exchanger comprises a clean shelf introduction, device and a dirty shelf removal device, these two devices being grouped downstream from the product clearing station.

The clean shelf introduction device may be installed downstream from a separate product loading station, and the dirty shelf removal device may be installed downstream from the product clearing station.

The clean shelf introduction device preferably comprises a pusher arranged for pushing a shelf arranged at the top of a stack of clean shelves in a magazine, into an empty space of a pendulant product carrier and the dirty shelf removal device comprises a claw arranged for pulling a dirty shelf out of a pendulant product carrier and for bringing it to the top of a stack of dirty shelves in a magazine.

Said magazines comprise a notched belt driven by a driving motor and a console carrying the clean and dirty shelves respectively.

In an alternative embodiment the automatic shelf exchanger comprises a device for feeding empty shelves to be loaded located in the loading station and a device for recovering empty unloaded shelves, and the device for feeding empty shelves to be loaded is associated with a device for loading layers of products, the empty unloaded shelf recovery device being associated with a device for unloading layers of products identical to the loading device.

The present invention will be better understood with reference to the description of a preferred embodiment and alternative embodiments and to the attached drawing given by way of non limiting example, in which:

FIG. 1 shows a perspective view illustrating a preferred embodiment of the pendulant storage installation according to the invention, FIG. 2 shows a simplified perspective view illustrating the basic concept of one of the modules forming the installation shown in FIG. 1, FIGS. 3, 4 and 5 show three distinct combinations of modules for realising an installation according to the invention, FIG. 6 shows a lateral elevation view of the installation of figure 5, FIG. 7 shows a schematical side elevation view of an automatic shelf exchanger, FIG. 8 shows a view of the driving mechanism of the automatic exchanger of FIG. 7, and FIG. 9 shows a schematical view of an alternative embodiment in which layers of products are loaded on the shelves.

Referring to FIG. 1, the pendulant storage installation 10, shown in perspective, consists principally of a frame 11 which, in this case, has the shape of a parallelepipedic rectangle which defines a storage space inside which are mounted two endless conveying chains 12 and 13 between which pendulant product carriers 14 are suspended carrying shelves 15 on which products 16 are placed. Pendulant product carriers 14 are suspended horizontally by two lateral pivots on chains 12 and 13 which move parallel to each other along a multiple loop path comprising a first section called the feed section 17 going from a station 18 for loading the products onto the shelves to a receiving station 19, arranged for unloading said shelves, and a second section 20 called the return section in which the previously unloaded shelves return from the receiving station to the loading station. In the example shown, the installation comprises five pairs of lower sprocket wheels, A1, A2, A3, A4, A5 respectively, and five pairs of upper sprocket wheels, B1, B2, B3, B4, B5 respectively, which are mounted on fixed shafts carried by the frame. Furthermore, the installation comprises, in the example shown, two vertically mobile carriages 21 and 22 respectively, which each carry two pairs of lower sprocket wheels C1, C2 (for carriage 21) and C3, C4 (for carriage 22) and two pairs of upper sprocket wheels D1, D2 (for carriage 21) and D3, D4 (for carriage 22). The feed section of the closed circuit defined by the two chains 12 and 13 consists of chain segments passing from the loading station immediately below sprocket wheels B1, then above these sprocket wheels, below upper sprocket wheels D1 of carriage 21, above sprocket wheels B2, below upper sprocket wheels D2 of carriage 21, then above sprocket wheels B3, below upper sprocket wheels D3 of carriage 22, above sprocket wheels B4, below upper sprocket wheels D4 of carriage 22, and above sprocket wheels B5 in order to descend again vertically to the receiving station. The return section is defined by the sections of chain going from the return station below sprocket wheels A5, then above lower sprocket wheels C4 of carriage 22, below sprocket wheels A4, above lower sprocket wheels C3 of carriage 22, below sprocket wheels A3, above lower sprocket wheels C2 of carriage 21, below sprocket wheels A2, above lower sprocket wheels C1 of carriage 21, and finally below sprocket wheels A1 to return straight down to the loading station. As a result of the mobile carriages, the storage installation has a variable accumulation or storage capacity. When the carriages are in a high, position, the feed section is minimal, that is to say that the products are conveyed as quickly as possible from the loading station to the receiving station. On the other hand, when the carriages descend to a low position, the length of the feed section increases as does the installation storage capacity.

In the embodiment according to the invention, frame 11 is designed in accordance with a modular principle, that is to say that it is formed of one or more modules connected to each other, for the purpose of allowing a configuration which is perfectly suited to the needs of the user and which satisfies the requirements imposed by the specifications of the intended application.

FIG. 2 shows a bare perspective view, which illustrates the design of a basic module. This basic module 30 essentially comprises four vertical columns 31a, 31b, 31c, and 31d, which are associated at each of their respective ends with lower connecting members 32a, 32b, 32c, 32d respectively and upper connecting members 33a, 33b, 33c and 33d respectively. These connecting members are constituted by studs which are welded, cased or fixed by conventional means (bolts, screws) to the ends of the vertical columns, these studs having a parallelepipedic shape of square or rectangular cross-section, so as to have four flat faces which enable the fixing of lower longitudinal coupling members 34 and upper longitudinal coupling members 35 and lower transversal coupling members 36 and upper transversal coupling members 37, which assure the connection between the columns of the module. Lower upper longitudinal coupling members 34 and 35 each comprise a crossbeam, 34a and 35a respectively, supporting one of lower sprocket wheels A and one of upper sprocket wheels B respectively. Two complementary pairs of lower sprocket wheels A are carried by lower connecting members 32a, 32b, 32c and 32d. Likewise, two pairs of upper sprocket wheels B are carried by upper connecting members 33a, 33b, 33c and 33d. Longitudinal coupling members 34 and 35 further comprise two stiffening rods 38, 39 arranged on either side of crossbeam 34a and 35a respectively. These stiffening rods generate prestresses which assure the longitudinal rigidity of basic module 30. Struts can, if required, be used to connect diagonally the connecting members arranged on a same side of the Installation in order to reinforce the stability of the assembly.

In order to arrange the installation best suited to the envisaged application, it is possible to combine several modules by arranging them in prolongation of each other and/or by superposing them. To this end, connecting members 32a, 32b, 32c, 32d and 33a, 33b, 33c 33d are provided with appropriate coupling means.

FIGS. 3, 4 and 5 illustrate schematically three alternative module combinations formed from a basic module and/or an extension of this basic module. In the embodiment shown in FIG. 3, a basic module 30 substantially identical to that shown in FIG. 2 is used. A module 130, which is derived from basic module 30 by a simple reduction of the height of columns 31a, 31b, 31c and 31d, is superposed onto basic module 30. Two identical modules 230, are juxtaposed in prolongation of basic module 30, said modules 230 being derived from basic module 30 since longitudinal coupling members 34 and 35 have been enlarged in comparison to the basic module, which enables two intermediary sprocket wheels respectively A and B to be installed and consequently the storage capacity of the installation to be increased. Finally, two identical modules 330 have been superposed onto modules 230. They differ from modules 230 in that the height of the columns has been reduced to be equal to that of the columns of module 130.

As a result of the modular concept and the assembly concept based on connecting members connected to each other by columns of variable length and coupling members of variable length, it is particularly easy, as the figure shows, to use an optimal volume, for example delimited by the ground S and the ceiling P of existing premises for temporarily storing products. In an embodiment of this type, certain of the sprocket wheels are removed, for example the upper sprocket wheels of a first module and the lower sprocket wheels of a second module when the second module is superposed onto the first.

FIG. 4 illustrates another embodiment which exploits in an optimum manner a space delimited by four levels N1, N2, N3 and N4. One can affirm straight away that known types of storage devices could not be used in premises having such a complex configuration and that this use would compel the user to undertake costly building transformation works requiring the line to be halted. This embodiment consists of basic module 30 complemented by three juxtaposed and superposed modules 230, as defined with reference to FIG. 3, and by module 130 superposed onto basic module 30 as well as module 330 superposed onto two modules 230.

Figure 1:
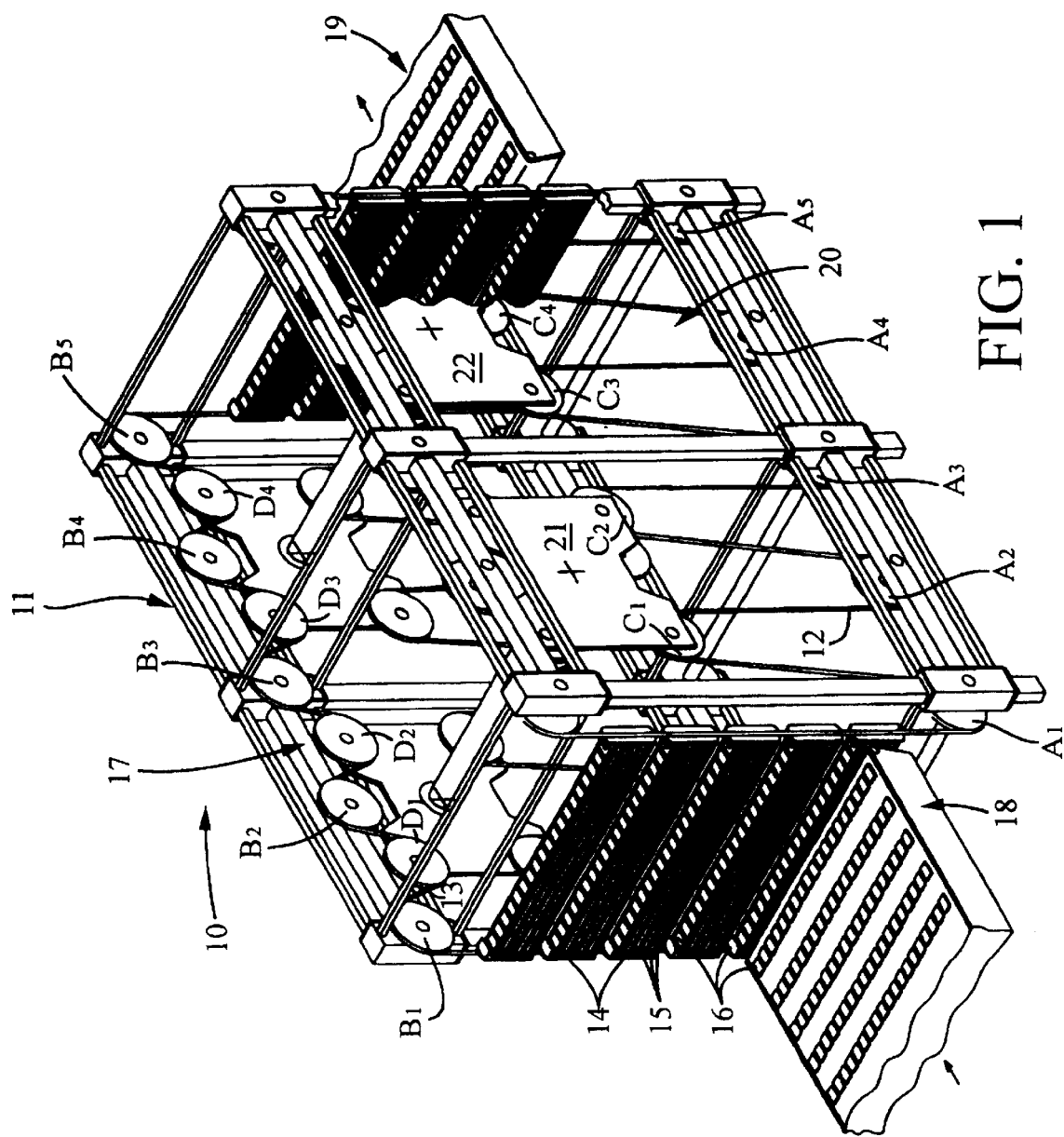
Figure 2:
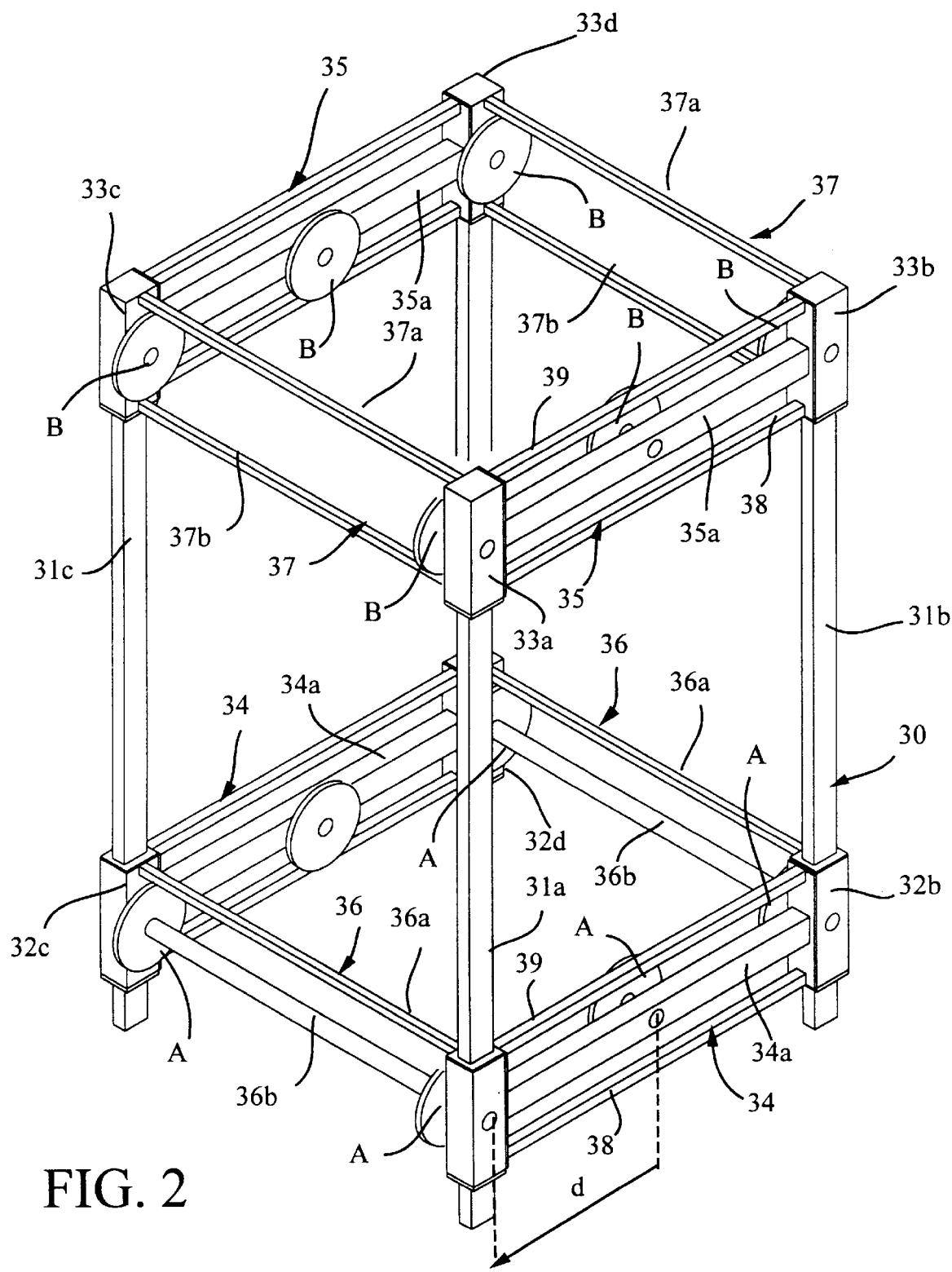
Figure 3:
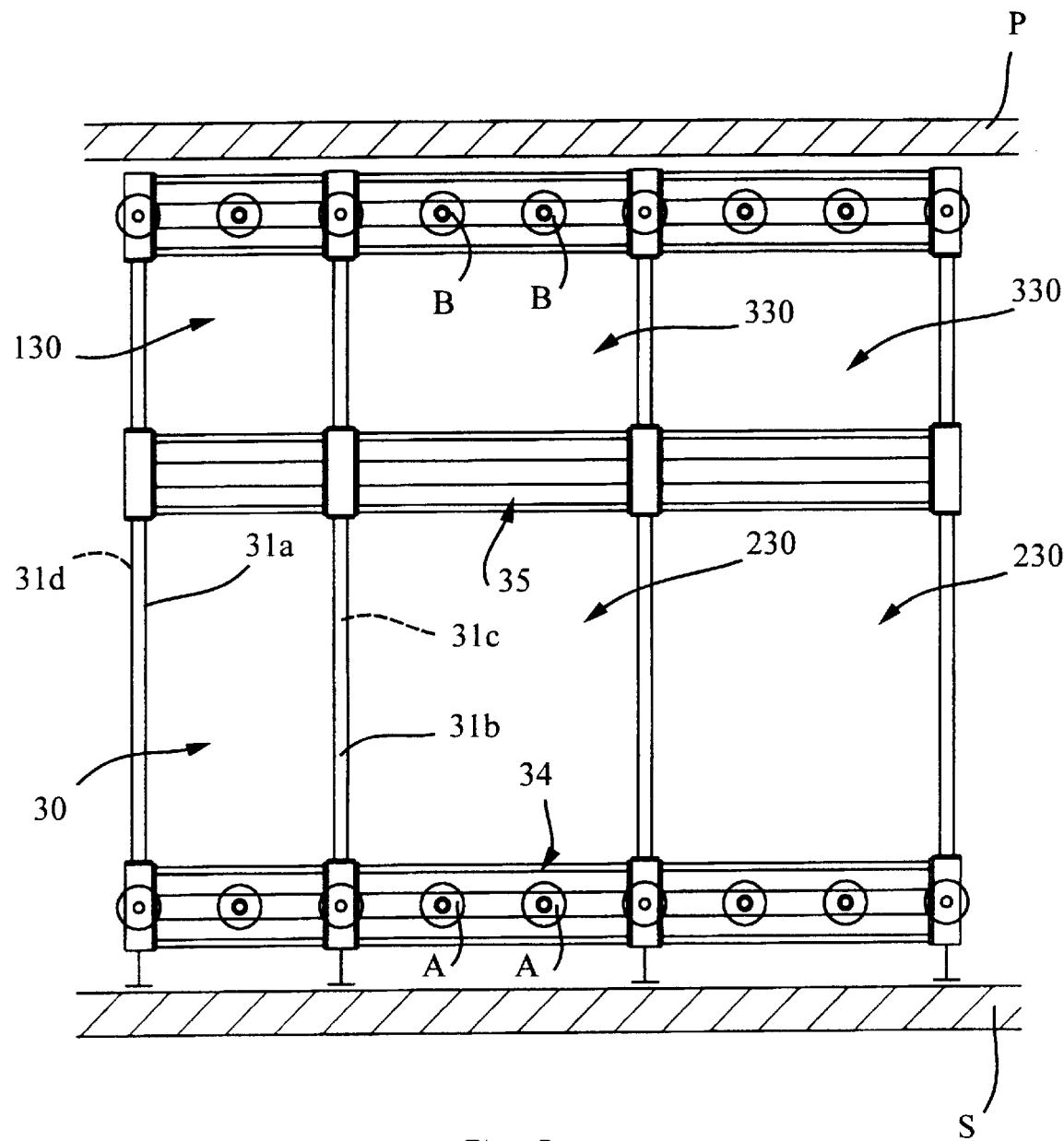
Figure 4:
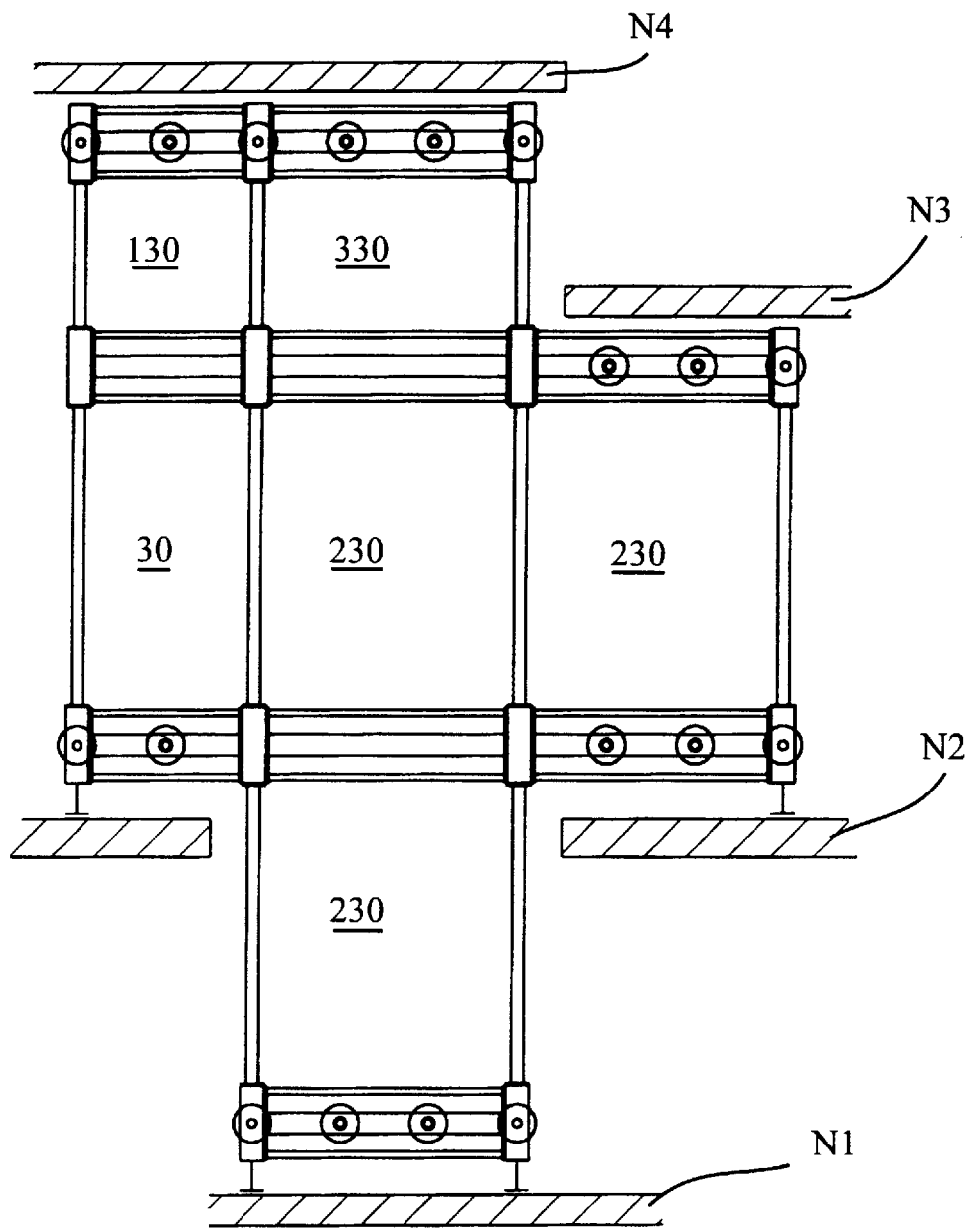
Figure 6:
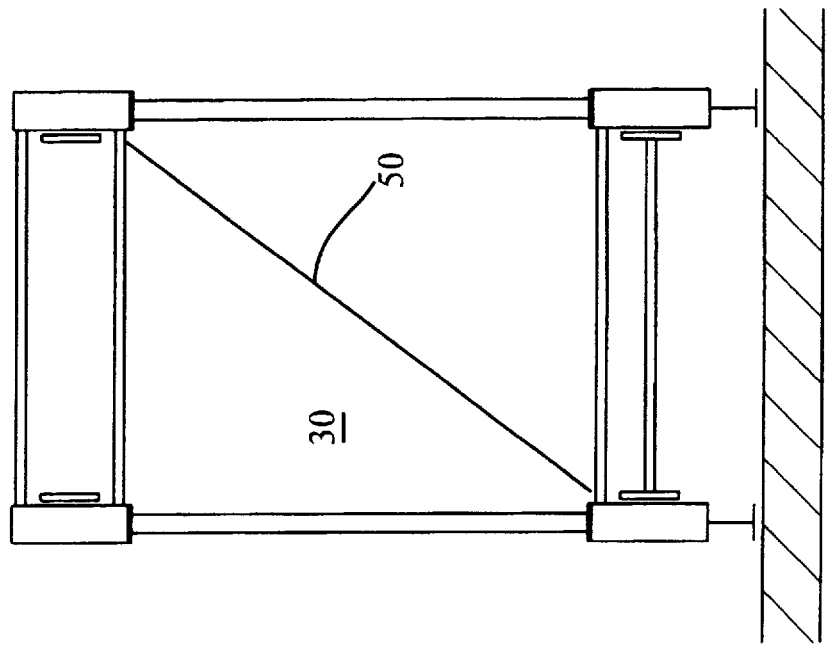
FIG. 6 shows a lateral view of the installation of FIG. 5. The existence of a strut 50, which contributes to the stability of this installation, will be noted in particular.

This modular concept allows adaptation to all sites and all applications and in addition permits the installation to evolve, in particular permitting the storage volume to be increased as a function of a growth in needs.

It will be noted however that the distance between two sprocket wheels A and between two sprocket wheels B is constant. It is linked to the minimum separation between the pendulant product carriers of two adjacent columns, this minimum separation being determined in such a way that these pendulant product carriers do not collide with each other during their movements, it follows from the fact that sprocket wheels A are equidistant, that the length of lower longitudinal coupling members 34 is standard for a module type. For example, for basic module 30, this length is approximately equal to twice the distance between two sprocket wheels A, namely 2d if d is the distance between two sprocket wheels A. In the case of modules 230 and 330, this length is equal to 3d.

The same reasoning is valid for sprocket wheels E and upper longitudinal coupling members 35 whose length is a integer multiple of distance d which separates the axes of two sprocket wheels A or B.

Generally, the length of the longitudinal coupling members is between d and nd, where n is an integer greater than 1.

Figure 7:
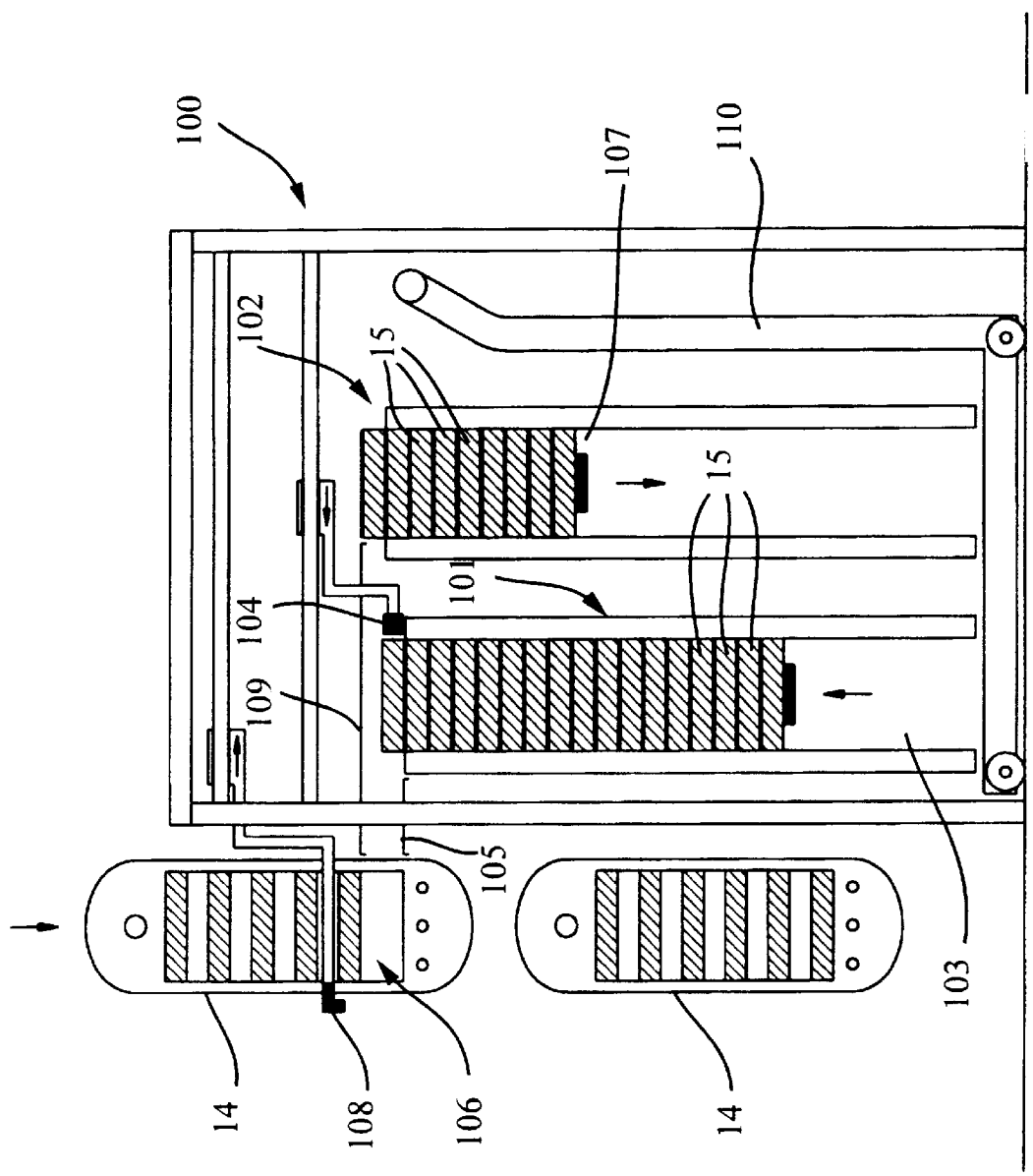
Figure 8:
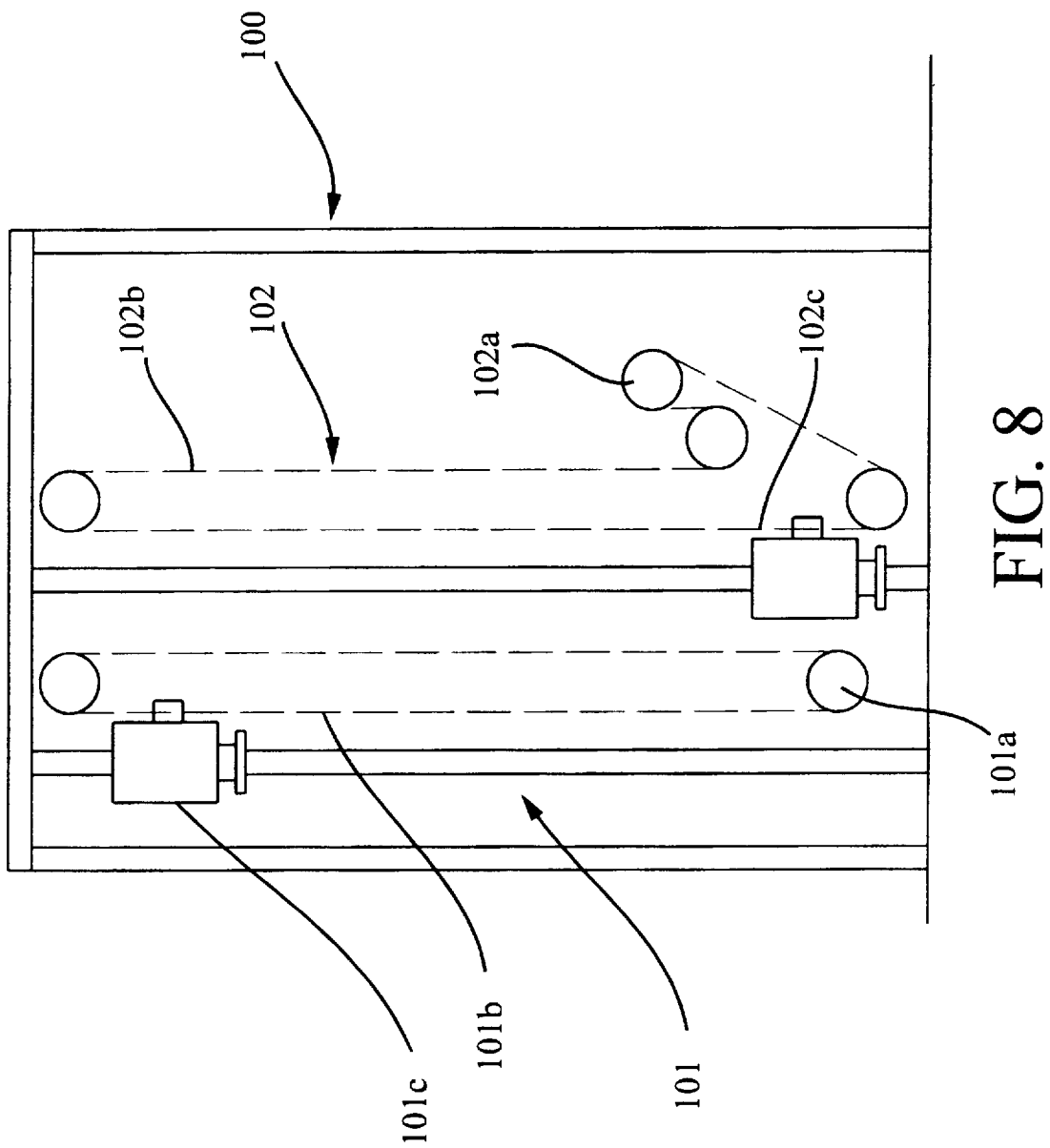

When pendulant product carriers 14 carry shelves 15 intended to receive products such as bars of chocolate which leave particles or crumbs which dirty said shelves, it is necessary to clean the shelves regularly. In known installations, this cleaning is carried out manually. The perfectly symmetrical shape of the shelves, their shape and the manner in which they are installed and held in position on the pendulant product carriers, enable the installation to be provided with an automatic shelf exchanger. An advantageous embodiment of an exchanger of this type is shown schematically by way of example in FIGS. 7 and 8. In this embodiment, exchanger 100 regroups a clean shelf introduction device 101 and a dirty shelf removal device 102. The operating sequences or the operation mode of these devices may be very varied according to requirements. The exchange of shelves is of course carried out when the products have already been cleared. This exchange may, for example, affect one pendulant product carrier in ten for each complete cycle of the installation, so that at the end of ten cycles all the pendulant product carriers have been cleaned.

Clean shelf introduction device 101 comprises a magazine 103 in which a series of clean shelves 15 is stacked and a pusher 104 arranged for pushing shelf 15 which is uppermost in the stack, causing it to slide onto a table 105 and positioning it in the empty space 16 facing pendulant product carrier 14. This empty space has been created by removal device 102 which has previously withdrawn a dirty shelf at the corresponding place.

This removal device 102 comprises a magazine 107 in which a series of shelves 15 to be cleaned is stacked, and a claw 108 arranged for withdrawing a shelf from the pendulant product carrier, sliding it onto a table 109 and bringing it to the top of the stack of shelves in magazine 107. Each time a shelf 15 is deposited, the height of magazine 107 is reduced by an amount corresponding to the thickness of the Lateral ends of a shelf. On the other hand, each time a shelf 15 is removed from magazine 103, the height of the stack is increased by an around corresponding to this same thickness.

In the example shown, the two magazines 103 and 107 are arranged on a carriage 110 which may be removed manually or automatically.

Figure 5:
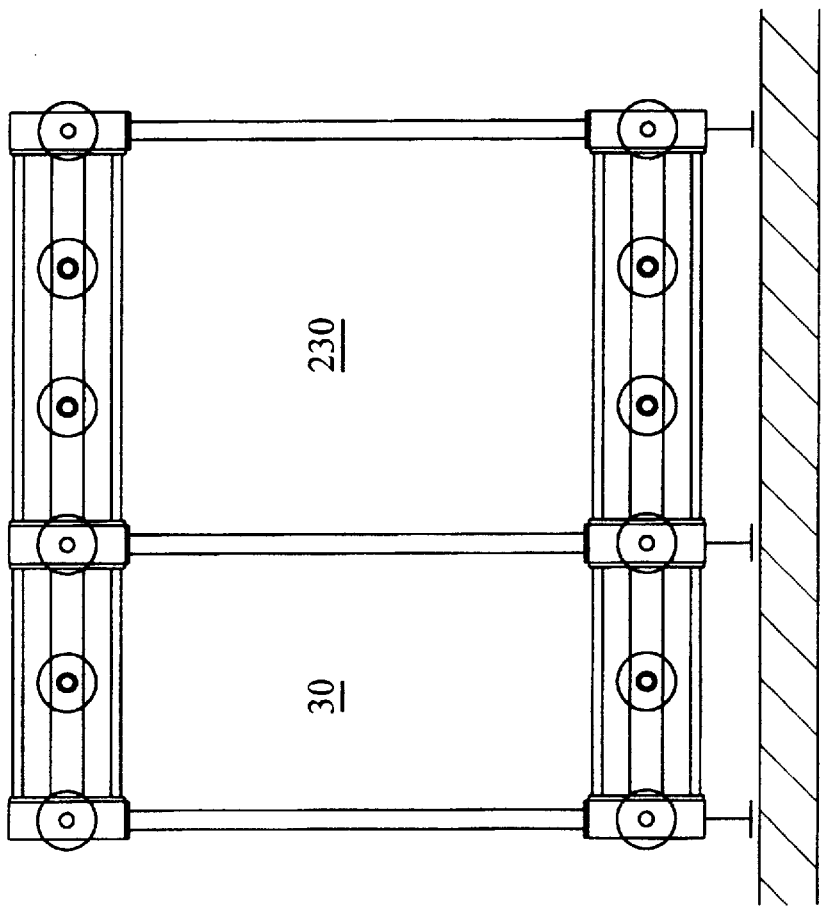
FIG. 5 illustrates a relatively simple embodiment which consists of basic module 30 juxtaposed to module 230.

FIG. 5 shows the driving mechanism of automatic exchanger 100. Device 101 and device 102 each comprise a driving motor, 101a and 102a respectively, arranged for each driving a notched belt, 101b and 102b respectively. These belts each carry a console, 101c and 102c respectively, which act as a support to the stack of clean shelves and the stack of dirty shelves respectively, The motors are controlled so as to move forward step by step. One of a the consoles moves upwards when the other moves downwards. The stack of clean shelves is in theory full when the stack of dirty shelves is empty and vice versa.

According to an alternative embodiment, the two introduction and removal devices may be separate. A solution of this type may for example be envisaged if one wishes to place rows or layers of products on the shelves before placing these shelves in the pendulant product carriers. In this case, the dirty shelf removal device is installed after the product clearing station and the clean shelf introduction device is installed downstream from the separate product loading station. This type of embodiment enables layers of products to be stored, which has never been able to be achieved with known installations.

Figure 9:
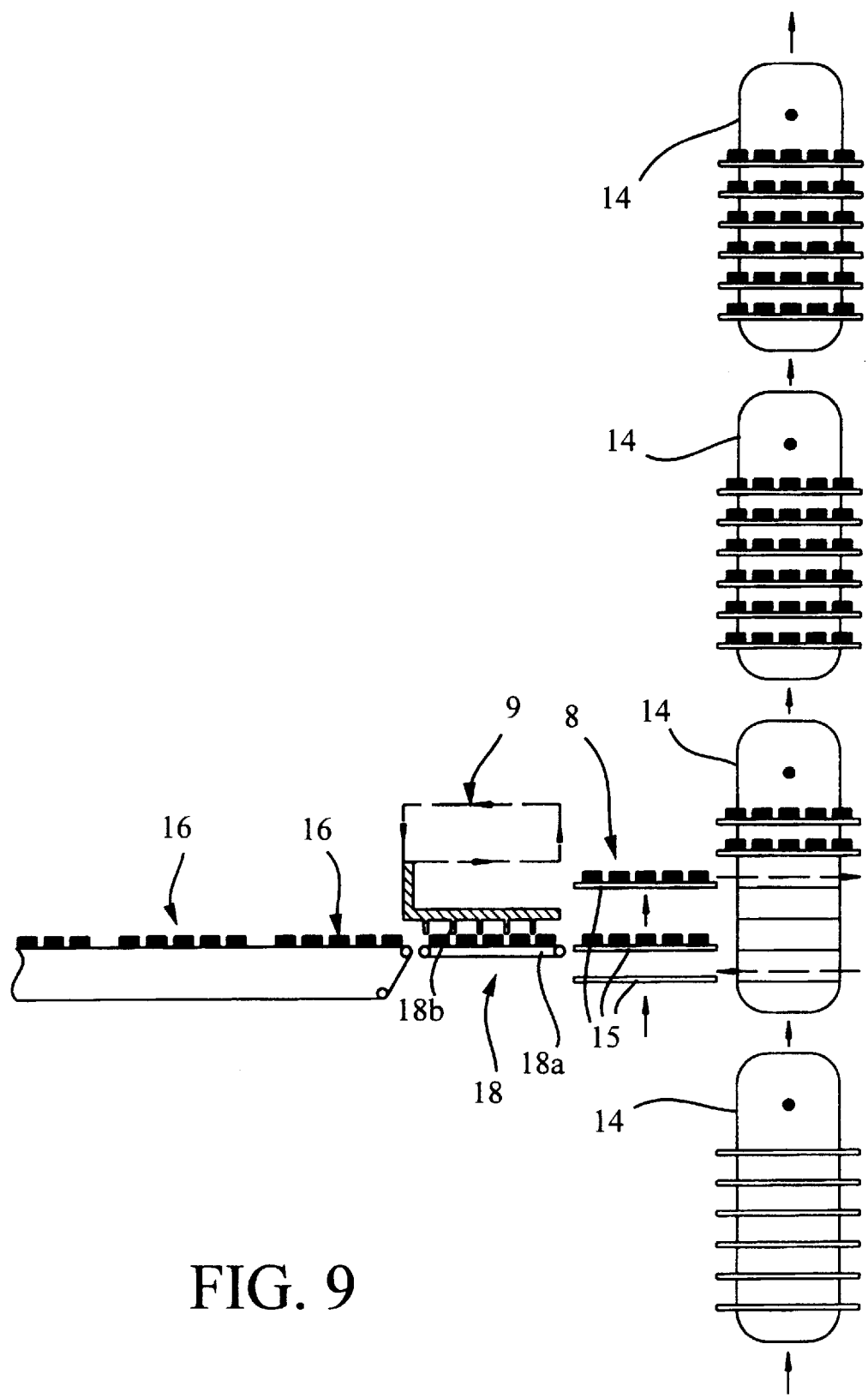

An embodiment of this type is shown in FIG. 9. Product loading station 18 is arranged for carrying out the loading of layers of products 16. This station is provided with an empty shelf feed device 8 and a product layer loading device 9. It further comprises a belt 18a and a guide 18b having a comb shaped structure in order to be able to hold the products individually in such a way that they keep their arrangement in layers when they are transferred onto shelves 15. These shelves are brought by a device as before and are placed on the pendulant product carrier after having been loaded with products arranged in layers. The recovery of the products is carried out in a similar manner in the receiving station with a product unloading device and an empty shelf recovery device.

I claim:
1. Pendulant product storage device, in particular for food products and more particularly for bars of chocolate or the like, these products being placed on shelves arranged horizontally on pendulant product carriers horizontally suspended on two chains moving parallel to each other in a closed circuit comprising a feed section going from a station for loading products on the shelves, to a product receiving station, arranged for unloading the shelves, and a return section in which the empty shelves are brought back from the receiving station to the loading station, in which the frame consists of at least one basic module (30) comprising four vertical columns (31*a*, 31*b*, 31*c*, 31*d*) which are connected to each other in pairs by lower longitudinal coupling members (34) and upper longitudinal coupling members (35) and by lower transversal coupling members (36) and upper transversal coupling members (37), characterised in that the vertical columns comprise at each of their ends four lower connecting members (32*a*, 32*b*, 32*c*, 32*d*) and upper connecting members (33*a*, 33*b*, 33*c*, 33*d*), in that these connecting members are provided with coupling means arranged for assuring the assembly of adjacent and/or superposed modules, and by at least one automatic shelf exchanger (100).

2. Installation according to claim 1, characterised in that the lower connecting members (32*a*, 32*b*, 32*c*, 32*d*) are arranged for carrying a lower sprocket wheel (A) and the upper connecting members (33*a*, 33*b*, 33*c*, 33*d*) are arranged for carrying an upper sprocket wheel (B) for guiding the chains.

3. Installation according to claim 1, characterised in that the lower longitudinal coupling members (34) are arranged for carrying at least one complementary sprocket wheel (A) and the upper longitudinal coupling members (35) are arranged for carrying at least one complementary sprocket wheel (B) for guiding the chains.

4. Installation according to claim 2, characterised in that the distance between two neighbouring lower sprocket wheels (A) and the distance between two neighbouring upper sprocket wheels (B) has a constant value d.

5. Installation according to claim 3, characterised in that the lower longitudinal coupling members (34) and the upper longitudinal coupling members (35) have a length substantially equal to a multiple of the distance d which separates two neighbouring sprocket wheels (respectively A or B).

6. Installation according to claim 1, characterised in that it comprises several juxtaposed and/or superposed modules, these modules being connected in pairs by common connecting members, and in that the longitudinal coupling members (34, 35) have lengths between d and nd, where n is an integer greater than 1.

7. Installation according to claim 1, characterised in that this exchanger (100) comprises a clean shelf introduction device (101) and a dirty shelf removal device (102).

8. Installation according to claim 7, characterised in that the clean shelf introduction device and the dirty shelf removal device (102) are grouped downstream from the product clearing station.

9. Installation according to claim 7, characterised in that the clean shelf introduction device (101) is installed downstream from a separate product loading station, and in that the dirty shelf removal device is installed downstream from the product clearing station.

10. Installation according to claim 7, characterised in that the clean shelf introduction device (101) comprises a pusher (104) arranged for pushing a shelf arranged at the top of a stack of clean shelves in a magazine (103), into an empty space of a pendulant product carrier (14).

11. Installation according to claim 7, characterised in that the shelf removal device comprises a claw (108) arranged for withdrawing a dirty shelf from a pendulant product carrier (14) and for bringing it to the top of a stack of dirty shelves in a magazine (107).

12. Installation according to claim 10, characterised in that said magazines (103, 107) comprise a notched belt (101*b*, 102*b*) driven by a driving motor (101*a*, 102*a*) and a console (101*c*, 102*c*) carrying the stacks of clean shelves and dirty shelves respectively.

* * * * *